(12) United States Patent
Waco et al.

(10) Patent No.: US 10,086,878 B2
(45) Date of Patent: Oct. 2, 2018

(54) HOOD GUIDING SYSTEM FOR A WORK VEHICLE

(71) Applicant: CNH Industrial America, LLC, New Holland, PA (US)

(72) Inventors: Douglas L. Waco, Oak Park, IL (US); William H. Adamson, Naperville, IL (US); Mark D. Klassen, Lockport, IL (US); William L. Schroeder, Cary, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/428,224

(22) Filed: Feb. 9, 2017

(65) Prior Publication Data

US 2018/0222532 A1 Aug. 9, 2018

(51) Int. Cl.
*B62D 25/12* (2006.01)
*B62D 25/08* (2006.01)

(52) U.S. Cl.
CPC ........... *B62D 25/12* (2013.01); *B62D 25/084* (2013.01)

(58) Field of Classification Search
CPC .............................. B62D 25/12; B62D 25/084
See application file for complete search history.

(56) References Cited

U.S. PATENT DOCUMENTS

| 1,833,768 | A | * | 11/1931 | Barnes | ................. | B62D 25/105 |
| | | | | | | 123/41.05 |
| 1,833,769 | A | | 11/1931 | Barnes | | |
| 1,943,927 | A | * | 1/1934 | Phillips | ................. | E05B 83/243 |
| | | | | | | 292/101 |
| 2,348,348 | A | * | 5/1944 | Krause | ...................... | E05D 1/04 |
| | | | | | | 16/354 |
| 2,410,734 | A | * | 11/1946 | Hitzelberger | .......... | B62D 25/12 |
| | | | | | | 180/69.2 |
| 2,606,625 | A | * | 8/1952 | Paton | ................... | B62D 25/105 |
| | | | | | | 16/297 |
| 3,419,099 | A | * | 12/1968 | Brumbaugh | ........... | B62D 25/10 |
| | | | | | | 180/69.24 |

(Continued)

FOREIGN PATENT DOCUMENTS

| DE | 10157709 | 6/2003 |
|---|---|---|
| EP | 1053929 | 11/2000 |

(Continued)

*Primary Examiner* — Jacob B Meyer
(74) *Attorney, Agent, or Firm* — Rickard K. DeMille; Rebecca L. Henkel

(57) ABSTRACT

A hood guiding system for a work vehicle may include first and second walls positioned within an engine compartment of the work vehicle. The system may also include a hood configured to extend in a crosswise direction of the work vehicle between a first side and a second side so as to least partially cover the engine compartment. Additionally, the system may include a first guide component coupled to the hood at or adjacent to its first side and a second guide component coupled to the hood at or adjacent to its second side. When the hood is moved from an opened position to a closed position, the first and second guide components may be configured to contact outer surfaces of the first and second walls, respectively, to guide the hood towards the closed position.

18 Claims, 8 Drawing Sheets

(56) References Cited

U.S. PATENT DOCUMENTS

| | | | | |
|---|---|---|---|---|
| 3,487,887 A * | 1/1970 | Pensa | ............... | B62D 25/10 16/361 |
| 3,767,001 A * | 10/1973 | Chupick | ............... | B62D 25/12 16/291 |
| 4,073,524 A * | 2/1978 | Gianessi | ............... | E05F 7/005 292/193 |
| 4,223,483 A * | 9/1980 | Stafford | ............... | E05D 15/42 49/250 |
| 4,270,623 A * | 6/1981 | Brandl | ............... | B62D 25/10 180/69.2 |
| 4,359,121 A | 11/1982 | Messner et al. | | |
| 4,382,482 A | 5/1983 | Brandl et al. | | |
| 5,101,921 A * | 4/1992 | West | ............... | E05D 3/145 16/370 |
| 5,120,248 A * | 6/1992 | Daleiden | ............... | B63H 20/32 292/202 |
| 5,730,239 A * | 3/1998 | Holter | ............... | B62D 25/12 180/69.21 |
| 5,791,428 A * | 8/1998 | Noll | ............... | B62D 25/12 180/69.21 |
| 6,167,977 B1 * | 1/2001 | Adamson | ............... | B62D 25/10 16/289 |
| 6,311,796 B1 | 11/2001 | Mayer | | |
| 7,536,752 B2 * | 5/2009 | Laursen | ............... | H04Q 1/09 126/194 |
| 7,766,419 B2 | 8/2010 | Krolnik et al. | | |
| 8,276,699 B2 | 10/2012 | Elhardt et al. | | |
| 8,997,907 B2 | 4/2015 | Rode | | |
| 9,027,685 B2 * | 5/2015 | Howell | ............... | B62B 9/00 180/69.2 |
| 9,561,717 B2 * | 2/2017 | Barzen | ............... | F01P 5/06 |
| 9,616,741 B2 * | 4/2017 | Opitz | ............... | B60K 11/04 |
| 9,676,271 B1 * | 6/2017 | Barzen | ............... | B60K 11/08 |
| 2003/0221582 A1 * | 12/2003 | Burke | ............... | B61D 3/18 105/355 |
| 2014/0252785 A1 * | 9/2014 | Kim | ............... | E02F 3/325 292/338 |
| 2016/0193910 A1 * | 7/2016 | Barzen | ............... | F01P 5/06 180/68.1 |
| 2016/0288638 A1 * | 10/2016 | Opitz | ............... | B60K 11/04 |

FOREIGN PATENT DOCUMENTS

| GB | 1024739 | 4/1966 |
|---|---|---|
| WO | WO 2016/012030 | 1/2016 |

* cited by examiner

HOOD GUIDING SYSTEM FOR A WORK VEHICLE

FIELD OF THE INVENTION

The present subject matter relates generally to work vehicles and, more particularly, to a hood guiding system for a work vehicle to facilitate alignment of the vehicle's hood during closure and/or to stabilize the hood in the cross-wise or side-to-side direction of the vehicle when the hood is closed.

BACKGROUND OF THE INVENTION

Work vehicles, such as tractors and other agricultural vehicles, typically include a hood that at least partially encases or covers an engine compartment defined at the front or rear end of the work vehicle. Various under-hood components, such as the engine, and one or more components of the air intake, air cleaning, fuel supply, electrical, cooling, and/or exhaust systems of the work vehicle, are typically housed within the engine compartment. To access such components, the vehicle's hood is configured to be pivoted upward to an opened position. For instance, the hood may be pivoted upward about its aft end (i.e., the end closest to the cab) such that the front end of the hood (i.e., the end positioned at the front of the vehicle) is moved away from the engine compartment. Once access to the engine compartment is no longer desired, the hood may then be pivoted downwardly to its closed position.

Due to the configuration of conventional work vehicles, vehicle hoods are often quite long and are typically pivotally coupled to the vehicle at a single location, such as at the aft end of the hood. As a result, the front end of the hood may experience a significant amount of cross-wise or side-to-side movement as the hood is being moved from its opened position to its closed position, thereby resulting in the front end of the hood becoming offset from the center of the engine compartment or otherwise becoming misaligned in the cross-wise or side-to-side direction of the work vehicle. Such misalignment can result in the locking mechanism for the hood not engaging the associated latch, thereby preventing the hood from being properly closed. Moreover, the misalignment of the hood can also result in the hood inadvertently contacting and subsequently damaging one or more of the under-hood components of the work vehicle.

Accordingly, a system for guiding a vehicle hood during closure that addresses one or more of the issues identified above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a hood guiding system for a work vehicle. The system may include first and second walls positioned within an engine compartment of the work vehicle, with the first and second walls being spaced apart from each other in a cross-wise direction of the work vehicle. The system may also include a hood configured to extend in a lengthwise direction of the work vehicle between a forward end and an aft end and in the crosswise direction between a first side and a second side so as to least partially cover the engine compartment. The hood may be pivotally coupled to a portion of the work vehicle such that the forward end is configured to be moved upwardly and downwardly relative to the engine compartment to move the hood between an opened position and a closed position. Additionally, the system may include a first guide component coupled to the hood at or adjacent to the first side of the hood and a second guide component coupled to the hood at or adjacent to the second side of the hood. When the hood is moved from the opened position to the closed position, the first and second guide components may be configured to contact outer surfaces of the first and second walls, respectively, to guide the hood towards the closed position.

In another aspect, the present subject matter is directed to a work vehicle. The vehicle may include a cooling module positioned within an engine compartment of the work vehicle. The cooling module may include at least one heat exchange component and first and second sidewalls spaced apart from each other in a cross-wise direction of the work vehicle. The vehicle may also include a hood configured to extend in a lengthwise direction of the work vehicle between a forward end and an aft end and in the crosswise direction between a first side and a second side so as to least partially cover the engine compartment. The hood may be pivotally coupled to a portion of the work vehicle such that the forward end is configured to be moved upwardly and downwardly relative to the cooling module to move the hood between an opened position and a closed position. The vehicle may also include a first guide roller coupled to the hood at or adjacent to the first side of the hood and a second guide roller coupled to the hood at or adjacent to the second side of the hood. When the hood is moved from the opened position to the closed position, the first and second guide rollers may be configured to contact outer surfaces of the first and second sidewalls, respectively, to guide the hood towards the closed position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
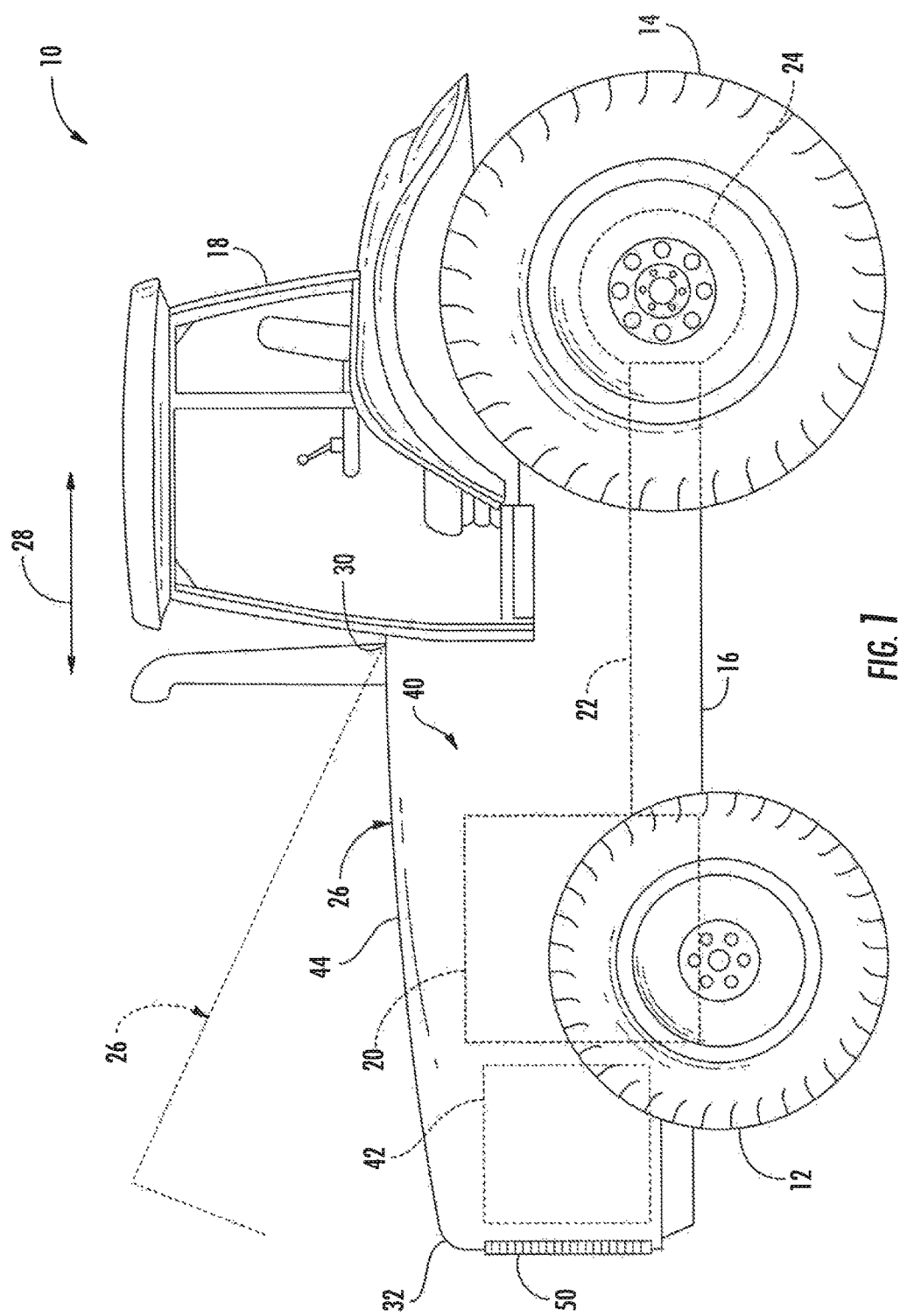
FIG. 1 illustrates a side view of one embodiment of a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a hood guiding system for a work vehicle. Specifically, in several embodiments, the system may include a pair of guide components, such as guide rollers, coupled to opposed sides of the interior of the vehicle's hood. Each guide roller may be configured to contact or otherwise be engaged against an internal wall of the work vehicle as the hood is being lowered to its closed position to ensure that the hood is properly centered and aligned relative to the work vehicle (e.g., relative to an associated latch configured to lock the hood in its closed position) For instance, as will be described below, in one embodiment, each guide roller may be configured to contact or roll against an outer surface of opposed sidewall of a cooling module of the work vehicle, thereby aligning the hood relative to the cooling module. Additionally, in one embodiment, one or more guide members may be installed within the engine compartment to facilitate aligning the guide wheels with the adjacent internal walls of the work vehicle. In addition to properly centering/aligning the hood relative to the work vehicle, the present subject matter may also be used to stabilize the hood in the cross-wise or side-to-side direction of the work vehicle when the hood is at its closed position. Moreover, by aligning the hood relative to the work vehicle, inadvertent contact between the hood and any adjacent components may be avoided, thereby preventing damage to the hood and/or such adjacent components when opening/raising the hood.

Figure 2:
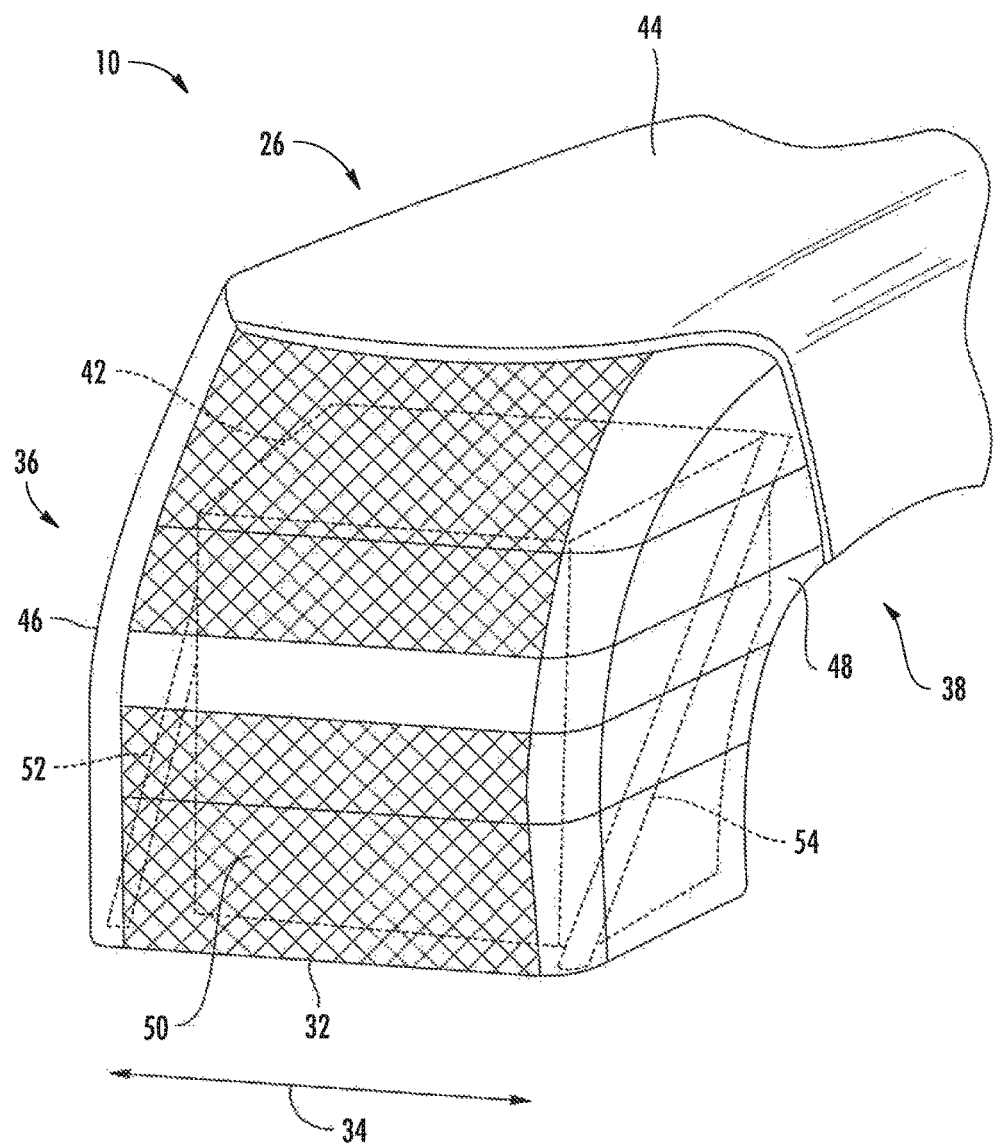
FIG. 2 illustrates a partial, perspective view of a front portion of the hood of the work vehicle shown in FIG. 1.

Referring now to the drawings, FIGS. 1 and 2 illustrate one embodiment of a work vehicle 10 in accordance with aspects of the present subject matter. In particular, FIG. 1 illustrates a side view of the work vehicle 10 and FIG. 2 illustrates a partial, perspective view of a front portion of a hood 26 of the work vehicle 10 shown in FIG. 1. It should be appreciated that, although the work vehicle 10 illustrated herein is configured as an agricultural tractor, the work vehicle 10 may generally be configured as any suitable work vehicle known in the art, such as various other agricultural vehicles, earth-moving vehicles, road vehicles, loaders and/or the like.

As shown in FIG. 1, the work vehicle 10 includes a pair of front wheels 12, a pair or rear wheels 14, and a chassis 16 coupled to and supported by the wheels 12, 14. An operator's cab 18 may be supported by a portion of the chassis 16 and may house various control devices (not shown) for permitting an operator to control the operation of the work vehicle 10. Additionally, the work vehicle 10 may include an engine 20 and a transmission 22 mounted on the chassis 16. The transmission 22 may be operably coupled to the engine 20 and may provide variably adjusted gear ratios for transferring engine power to the wheels 12, 14 via a differential 24.

The work vehicle 10 may also include a hood 26 configured to extend in a lengthwise direction of the work vehicle 10 (as indicated by arrow 28 in FIG. 1) between an aft end 30 disposed adjacent to the cab 18 and a forward end 32 terminating at the front of the work vehicle 10. Additionally, the hood 26 may be configured to extend in a cross-wise direction of the work vehicle 10 (as indicated by arrow 34 in FIG. 2) between a first side 38 and a second side 38. As is generally understood, the hood 26 may be configured to least partially surround and/or cover the various under-hood components stored within the vehicle's engine compartment 40, such as the engine 20 and any other suitable under-hood components (e.g., hydraulic components, pneumatic components, electrical components, mechanical component(s), storage tank(s), etc.). For instance, in addition to the engine 20, a cooling system or module 42 of the work vehicle 10 may be positioned within the engine compartment 40, such as at a location in front of the engine 20.

Additionally, as particularly shown in FIG. 1, the hood 26 may be configured to be pivotally coupled to a portion of the work vehicle 10 at or adjacent to its aft end 30 such that the hood 26 can be pivoted about the aft end 30 between a closed position (shown in solid lines in FIG. 1) and an opened position (shown in dashed lines in FIG. 1). Specifically, by pivoting the hood 26 upwardly such that the front end 32 of the hood 26 is moved away from the engine compartment 40, the hood 26 may be moved from its closed position to the opened position to provide access to the engine compartment 40. Similarly, by pivoting the hood 26 downwardly such that the front end 32 of the hood 26 is moved towards the engine compartment 40, the hood 26 may be moved from its opened position to the closed position to allow the hood 26 to cover the engine compartment 40.

Additionally, as particularly shown in FIG. 2, the hood 26 may generally include a top wall 44, a first sidewall 46 extending along its first side 36 between the forward and aft ends 32, 30 and a second sidewall 48 extending along its second side 38 between the forward and aft ends 32, 30. Moreover, the hood 26 may also include a front wall 50 disposed at its forward end 32. As is generally understood, the front wall 50 may include a screen or grille to allow an airflow to enter the engine compartment 40 and pass through the cooling module 42. Further as shown in FIG. 2, the hood 26 may also include first and second sealing flanges 52, 54 extending within the interior of the hood 26 along the first and second sidewalls 46, 48, respectively, from generally adjacent to the forward end 32 of the hood 26 upwardly and rearwardly in the direction of the rear end 30 of hood 26. As will be described below, such flanges 52, 54 may be configured to support one or more components of the disclosed hood guiding system 100 (FIGS. 4-8).

Figure 3:
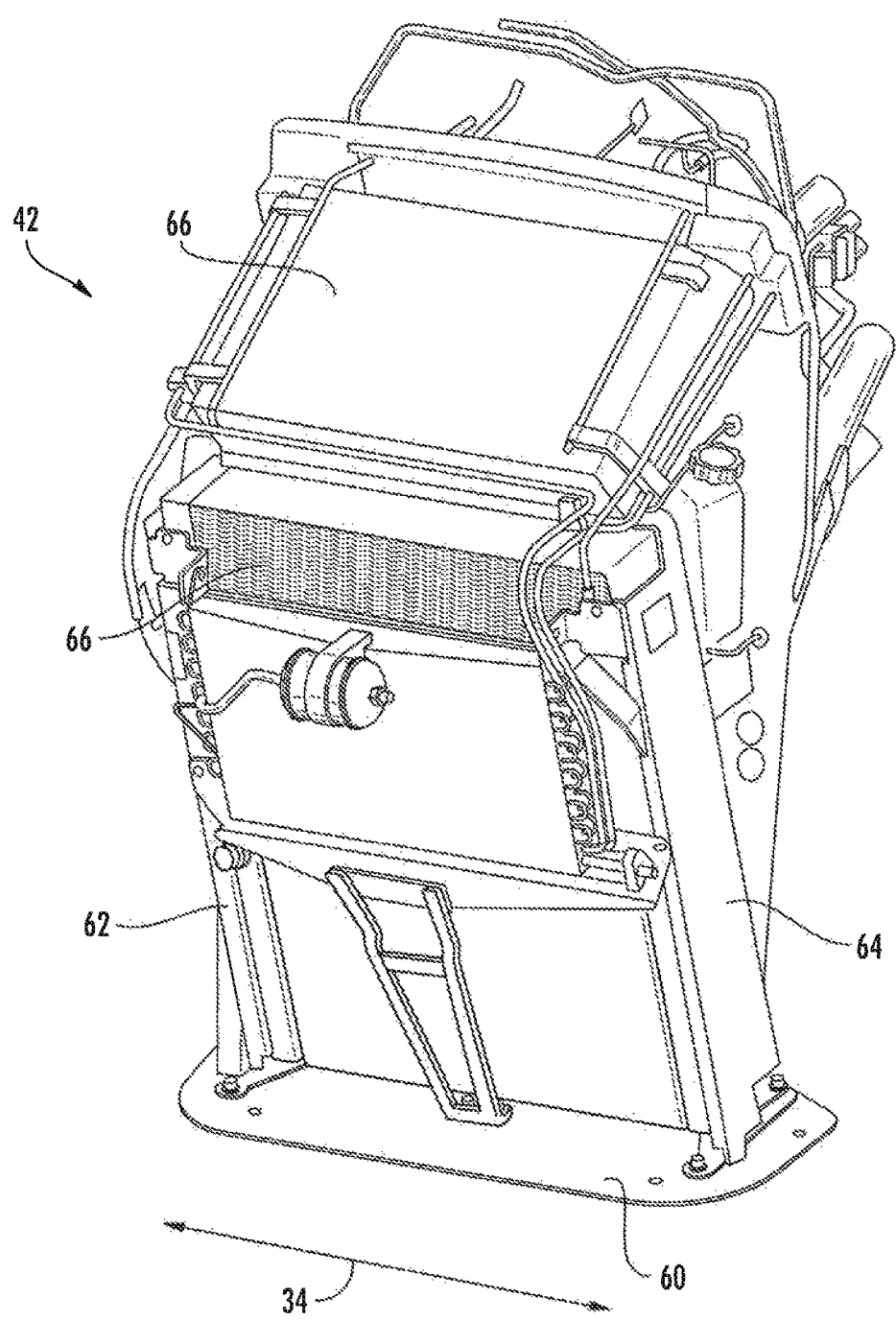
FIG. 3 illustrates a perspective view of one embodiment of a cooling module suitable for use within the work vehicle shown in FIG. 1 in accordance with aspects of the present subject matter.

Referring now to FIG. 3, a perspective view of one embodiment a cooling module 42 that may be installed within the engine compartment 40 of a work vehicle 10 is illustrated in accordance with aspects of the present subject matter. In general, the cooling module 42 may include one or more structural components configured to support and/or partially surround/encase one or more of the cooling system components of the cooling module 42. For instance, as shown in FIG. 3, the cooling module 42 may include a base mounting plate 60 configured to be directly or indirectly supported by or coupled to the chassis 16 of the work vehicle 10. Additionally, the cooling module 42 may include a pair of opposed sidewalls 62, 64 extending upwardly from the base mounting plate 60, with the sidewalls 62, 64 being spaced apart from each other in the cross-wise direction 34 of the work vehicle 10. Specifically, the module 42 may include a first sidewall 62 extending upwardly from the base mounting plate 60 such that the first sidewall 62 is configured to be positioned proximal to a portion of the first side 36 (FIG. 2) of the hood 26 when the hood 26 is moved to its closed position. Similarly, the module 42 may include a second sidewall 64 extending upwardly from the base mounting plate 60 such that the second sidewall 64 is configured to be positioned proximal to a portion of the second side 38 (FIG. 2) of the hood 26 when the hood 26 is moved to its closed position. It should be appreciated that, in addition to the base mounting plate 60 and the sidewalls 62, 64, the cooling module 42 may also include any other suitable structural components configured to support the various cooling system components of the work vehicle 10.

It should also be appreciated that the cooling module 42 may generally include any number of cooling system components supported above the base mounting plate 60 and/or positioned between the sidewalls 62, 64. For instance, as shown in FIG. 3, in one embodiment, the cooling module 42 may include one or more heat exchange components 66 supported between the first and second sidewalls 62, 64. As is generally understood, the heat exchange component(s) 66 may be configured to cool the engine fluid(s) and/or the other fluid(s) utilized during operation of the work vehicle 10 by transmitting such fluid(s) through a plurality of tubes having suitable heat transfer features (e.g., cooling fins, rods, coils and/or the like) so that heat is transferred from the fluid(s) to an airflow passing over and across the tubes. For instance, in several embodiments, the heat exchange component(s) 66 may correspond to one or more radiators, intercoolers, fuel coolers, transmission fluid coolers, engine oil coolers and/or the like. Additionally, the cooling module 42 may also include various other cooling system components supported above the base mounting plate 50 and/or positioned between the sidewalls 62, 64, such as the air conditioning condenser, portions of the fan shroud, various sets of tubing or hoses, and/or the like.

Figure 4:
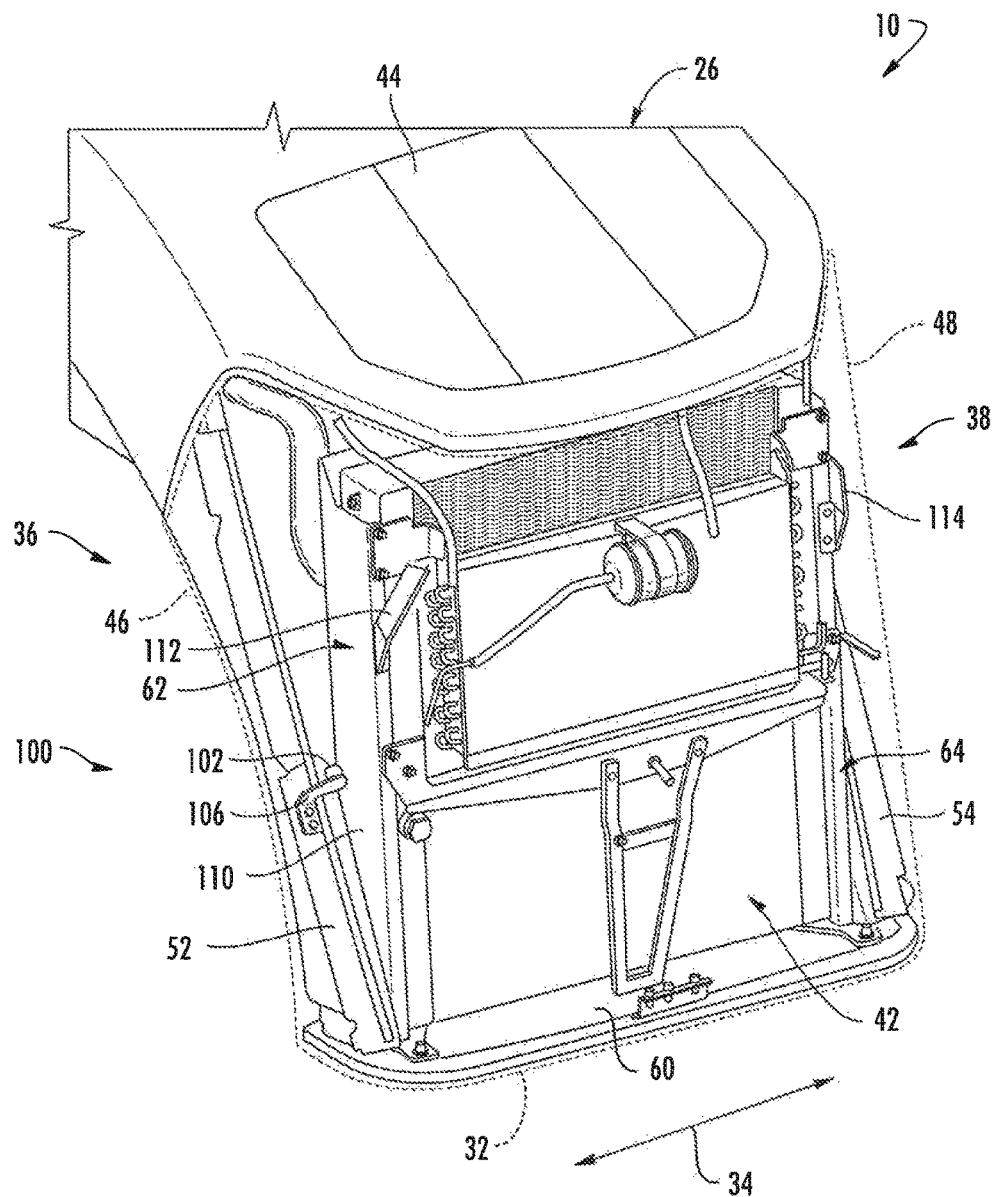
FIG. 4 illustrates a partial, perspective view of the front end of the work vehicle shown in FIG. 1 with a front portion of the hood being removed for purposes of illustration, particularly illustrating one embodiment of various components of a hood guiding system in accordance with aspects of the present subject matter.
Figure 5:
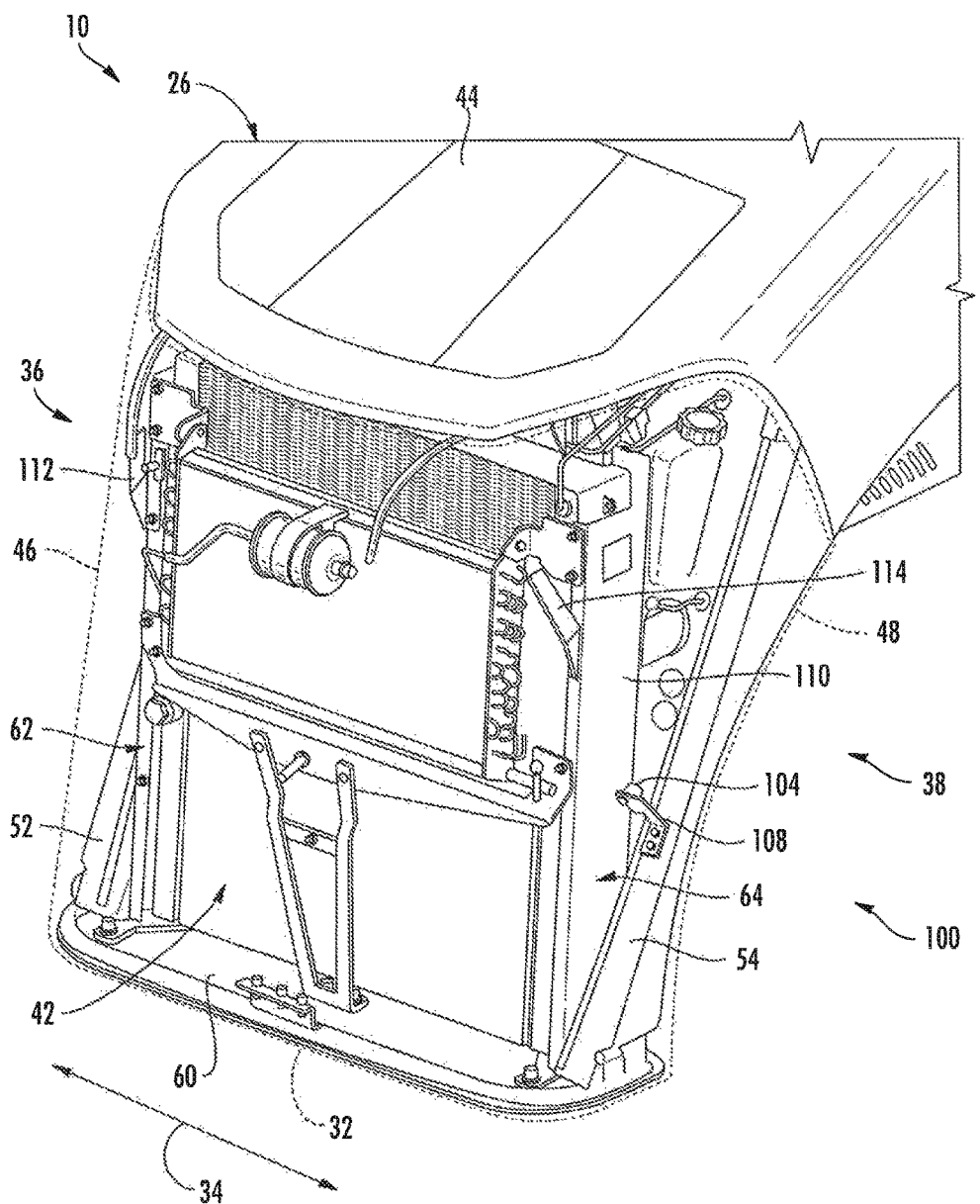
FIG. 5 illustrates another partial perspective view of the front end of the work vehicle shown in FIG. 4, particularly illustrating the system components installed on the opposed side of the front end of the work vehicle.
Figure 6:
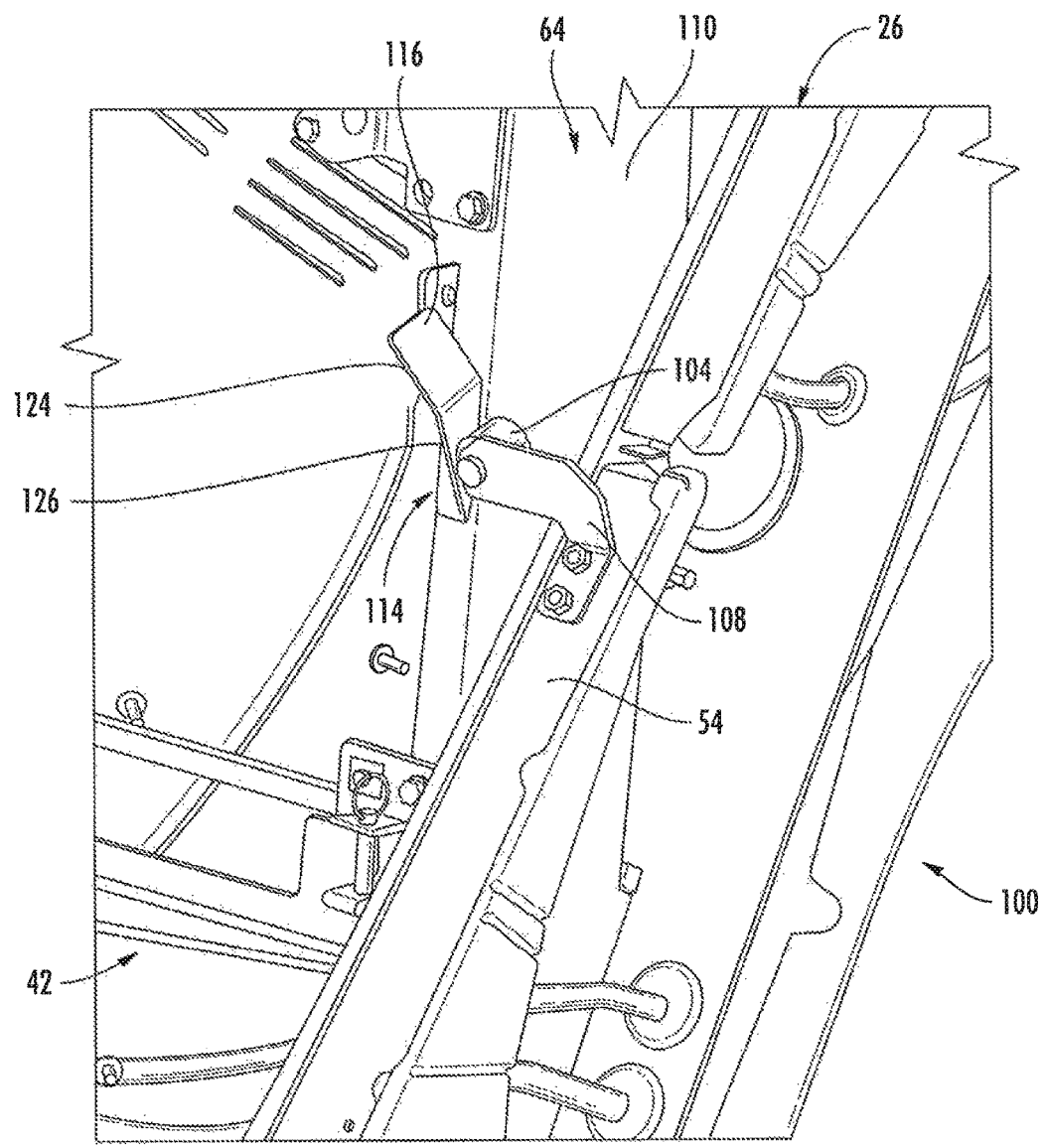
FIG. 6 illustrates a partial perspective view of several of the system components shown in FIG. 5 when the hood is located at a position above its closed position, particularly illustrating a guide roller of the system contacting a corresponding guide member of the system.
Figure 7:
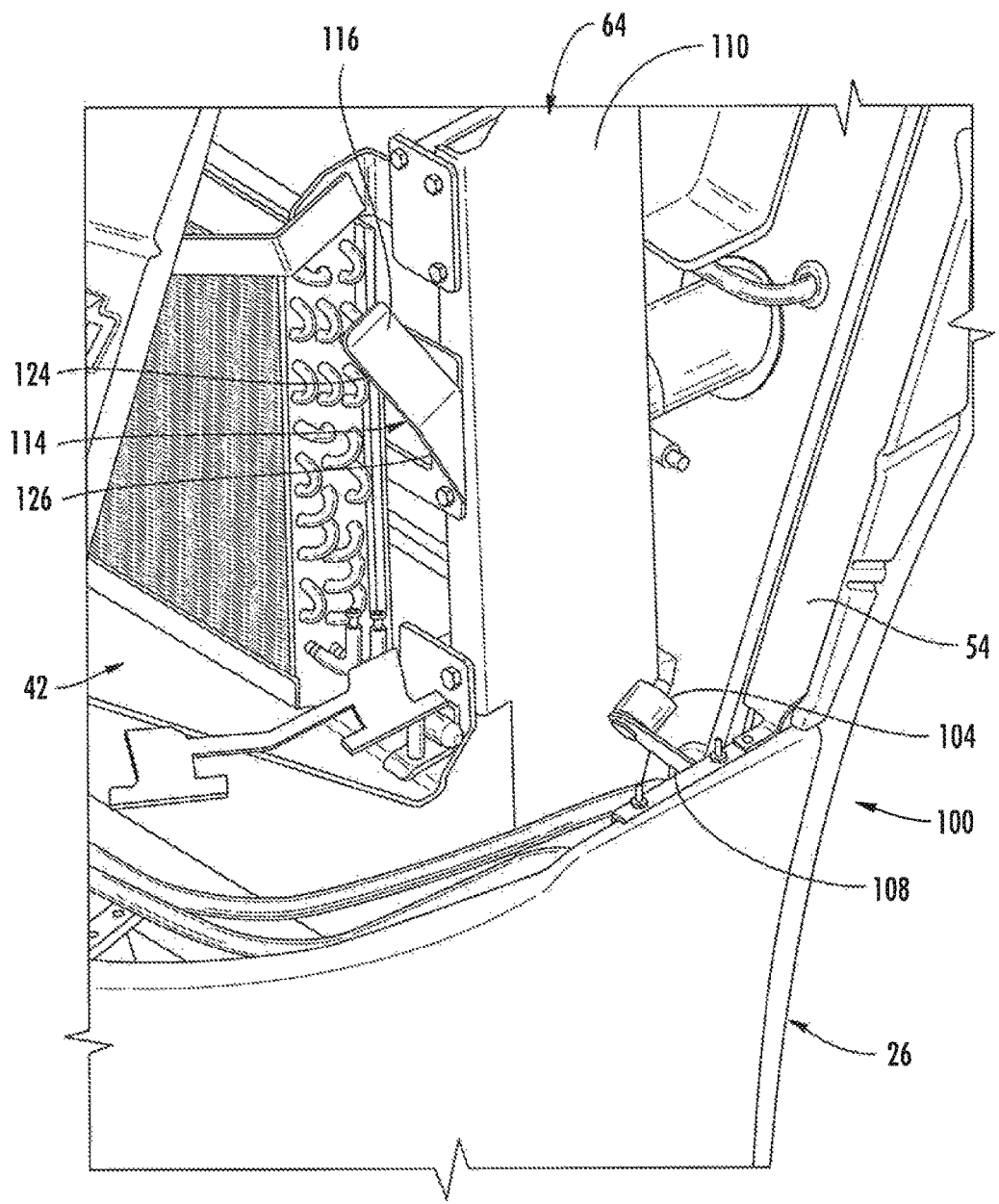
FIG. 7 illustrates another partial perspective view of the system components shown in FIG. 6 after the hood has been moved to its closed position, particularly illustrating the guide roller contacting an adjacent internal wall of the work vehicle.
Figure 8:
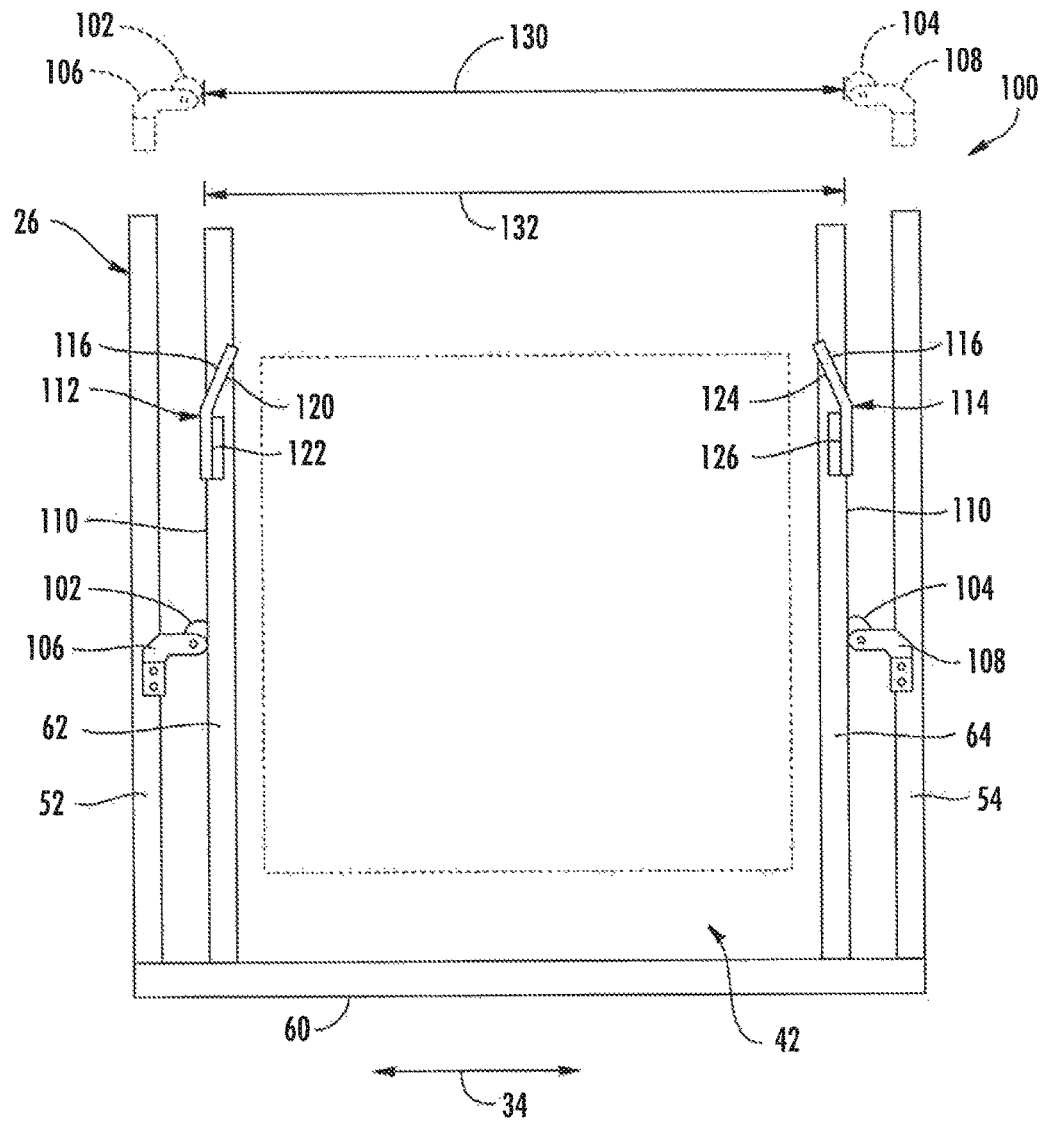
FIG. 8 illustrates a schematic, front view of the system components shown in FIGS. 4-7.

Referring now to FIGS. 4-8, several views of one embodiment of a hood guiding system 100 for a work vehicle 10 is illustrated in accordance with aspects of the present subject matter. Specifically, FIGS. 4 and 5 illustrate differing perspective, side views of the front portion of the work vehicle 10 described above, particularly illustrating a front section of the hood 26 in phantom lines to allow various components of the disclosed system 100 to be viewed. FIGS. 6 and 7 illustrate perspective views of portions of the system components 100 shown in FIG. 5, particularly illustrating the positional relationship of the system components as the hood 26 is moved from a location above its closed position (FIG. 6) to its fully closed position (FIG. 7). Additionally, FIG. 8 illustrates a schematic front view of the various system components shown in FIGS. 4-7.

In general, the system 100 may include a cooling module (e.g., the cooling module 42 described above with reference to FIGS. 1-3) and various guide and/or alignment features configured to assist in accurately guiding the hood 26 downwardly relative to the cooling module 42 as the hood 26 is being moved to its closed position. For instance, as will be described below, the guide/alignment features of the disclosed system 100 may facilitate properly centering or aligning the hood relative to the cooling module 42 (and, thus, relative to the remainder of the work vehicle 10) to ensure that the hood 26 does not inadvertently contact one or more internal components of the work vehicle 10 as it is being lowered to its closed position and to ensure that the hood 26 engages the latch (not shown) configured to maintain the hood 26 at the closed position.

As indicated above, the cooling module 42 may include first and second sidewalls 62, 64 extending upwardly from a base mounting plate 60 to allow one or more cooling system components of the work vehicle 10 to be supported between the sidewalls 62, 64. In several embodiments, the cooling module 42 may be configured to be positioned with the engine compartment 40 of the work vehicle 10 such that the opposed flanges 52, 54 of the hood 26 pass in close proximity to the sidewalls 62, 64 of the cooling module 42 when the hood 26 is moved downwardly towards its closed position. For instance, as shown in FIGS. 4 and 8, when the hood 26 is at its closed position, the first sidewall 62 may extend upwardly from the base mounting plate 60 generally adjacent to a portion of the first flange 52. Similarly, as shown in FIGS. 5 and 8, when the hood 26 is at its closed position, the second sidewall 64 may extend upwardly from the base mounting plate 60 generally adjacent to a portion of the second flange 54.

Moreover, in several embodiments, the system 100 may include first and second guide rollers 102, 104 coupled to the interior of the hood 26 along its opposed sides 36, 38. Specifically, as shown in FIGS. 4 and 8, the first guide roller 102 may be rotationally supported on a first mounting bracket 106 coupled to the first flange 52 such that the first guide roller 102 is positioned inwardly from the first sidewall 46 of the hood 26. Similarly, as shown in FIGS. 5 and 8, the second guide roller 104 may be rotationally supported on a second mounting bracket 108 coupled to the second flange 54 such that the second guide roller 104 is positioned inwardly from the second sidewall 48 of the hood 26. As indicated above, when the hood 26 is located at its closed position, the first and second flanges 52, 54 may be configured to extend generally adjacent to the first and second sidewalls 62, 64 of the cooling module 42, respectively. Thus, as will be described below, each guide roller 102, 104 may be configured to contact or be engaged against an outer surface 10 of the adjacent sidewall 62, 64 of the cooling module 42 as the hood 26 is being moved to its closed position.

Referring still to FIGS. 4-8, the system 100 may also include one or more guide members 112, 114 coupled to portions of the cooling module 42. For example, as shown in the illustrated embodiment, the system 100 may include a first guide member 112 coupled to the first sidewall 46 and a second guide member 114 coupled to the second sidewall 48. In general, each guide member 112, 114 may define an outer guide surface 116 (FIGS. 6-8) configured to contact the adjacent guide roller 102, 104 as the hood 26 is being moved towards its closed position. Specifically, each guide roller 102, 104 may, in one embodiment, be configured to contact the adjacent guide member 112, 114 and roll downwardly across its outer guide surface 110 as the hood 26 is lowered relative to the cooling module 42.

In several embodiments, each guide member 112, 114 may include an angled portion defining an upper section of its outer guide surface 110 and a vertical base portion defining a lower section of its outer guider surface 110. For instance, as shown in FIG. 8, the first guide member 112 may include a first angled portion 120 and a first base portion 122. The first angled portion 120 may generally be configured to extend inwardly from the first base portion 122 in the cross-wise direction 34 of the work vehicle 10 so as to extend towards the opposite side of the hood 26 (e.g., towards the second sidewall 64 of the cooling module 42). Additionally, the first base portion 122 may generally be configured to be coupled to the first sidewall 62 of the cooling module 42 so that the first base portion 122 extends vertically adjacent to such sidewall 62. Similarly, as shown in FIGS. 6-8, the second guide member 114 may include a second angled portion 124 and a second base portion 126, with the second angled portion 124 being configured to extend inwardly from the second base portion 126 in the cross-wise direction 34 of the work vehicle 10 so as to extend towards the opposite side of the hood 26 (e.g., towards the first sidewall 62 of the cooling module 42). Moreover, as shown in FIGS. 6-8, the second base portion 126 may generally be configured to be coupled to the second sidewall 64 of the cooling module 42 so that the second base portion 126 extends vertically adjacent to such sidewall 64.

Each angled portions 120, 124 of the guide members 112, 114 may generally be configured to serve as the initial contact point(s) for the rollers 102, 104 as the hood 26 is lowered relative to the cooling module 42. For instance, due to the inwardly extending orientation of the angled portions 120, 124, at least one of the rollers 102, 104 may be configured to contact the angled portion 120, 124 of the adjacent guide member 112, 114 as the hood 26 is being lowered despite the hood 26 being offset from center or otherwise misaligned in the cross-wise direction 34 of the work vehicle 10. Thereafter, as the hood 26 is further lowered relative to the cooling module 42, the contact between the roller(s) 102, 104 and the angled portion(s) 120, 124 may force the hood 26 into alignment with the base portions 122, 126 of the guide members 112, 114 and, thus, into alignment with the adjacent sidewalls 62, 64 of the cooling module 42.

Moreover, as shown by the difference in the position of the hood 26 between FIGS. 6 and 7, by aligning the rollers 102, 104 with the sidewalls 62, 64 of the cooling module 42 via the engagement with the guide members 112, 114, the rollers 102, 104 may transition from contacting the base portions 122, 126 of the guide members 112, 114 to contacting the outer surfaces 110 of the sidewalls 62, 64 as the hood 26 is lowered relative to the cooling module 42 towards its closed position. For instance, in one embodiment, the lower section of the outer guide surface 116 defined by each base portion 122, 126 of the guide members 112, 114 may be generally aligned with the outer surface 110 of the adjacent sidewall 62, 64 (e.g., by configuring portions of such surfaces 110, 116 to be co-planar or substantially co-planar). Thus, the rollers 102, 104 may simply roll across the interface defined between each guide member 112, 114 and the adjacent sidewall 62, 64 of the cooling module 42.

It should be appreciated that, in one embodiment, a cross-wise width 130 (FIG. 8) defined between the first and second rollers 102, 104 when the rollers 102, 104 are not engaged with the sidewalls 62, 64 of the cooling module 42 (e.g., when the hood 26 is at its raised or open position) may be less than a corresponding cross-wise width 132 (FIG. 8) defined between the outer surfaces 110 of the sidewalls 62, 64 to provide an interference fit between the rollers 102, 104 and the sidewalls 62, 64 when the hood 26 is moved to its closed position. For instance, FIG. 8 illustrates the rollers 102, 104 located at both a raised or unengaged position (shown in dashed lines lines) at which the rollers 102, 104 are positioned above and do not contact the sidewalls 62, 64 (e.g., prior to the rollers 102, 104 contacting the guide members 112, 114) and a lowered or engaged position (shown in solid lines) at which the rollers 102, 104 are contacting the sidewalls 62, 64. When at the unengaged position, the cross-wise width 130 defined between the rollers 102, 104 in the cross-wise direction 34 of the work vehicle 10 may be less than the cross-wise width 132 defined between the outer surfaces 110 of the sidewalls 62, 64. As such, when the hood 26 is lowered and the rollers 102, 104 are moved to their engaged position, the interference fit provided between the rollers 102, 104 and the sidewalls 62, 64 may force the rollers 102, 104 slightly outwardly as the rollers 102, 104 transition from the guide members 112, 114 to the sidewalls 62, 64, thereby providing precise alignment of the hood 26 relative to the cooling module 42. In addition, such outward motion of the rollers 102, 104 may, in turn, provide an outward force against the adjacent sidewalls 46, 48 of the hood 26, thereby providing the hood 26 with a more uniform appearance along both of its sides 36, 38.

It should be appreciated that, although the system 100 has been described herein with reference to the rollers 102, 104 contacting or engaging sidewalls 62, 64 of the cooling module 42, the rollers 102, 104 may generally be configured to contact or engage any suitable internal walls of the work vehicle 10 positioned adjacent to the opposed sides 36, 38 of hood 26. For instance, in other embodiments, the sidewalls 62, 64 may correspond to the wall(s) of one or more components installed within the engine compartment 40 of the work vehicle.

It should also be appreciated that, in alternative embodiments, the rollers 102, 104 may be replaced with any other suitable guide components. For instance, as opposed to using rollers 102, 104, bumpers may be coupled to the opposed flanges 52, 54 of the hood 26. In such an embodiment, the bumpers may be configured to contact or engage the sidewalls 62, 64 of the cooling module 42 or any other suitable internal walls of the work vehicle 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A hood guiding system for a work vehicle, the system comprising:
   a first wall positioned within an engine compartment of the work vehicle;
   a first guide member coupled to the first wall;

a second wall positioned within the engine compartment of the work vehicle, the first and second walls being spaced apart from each other in a cross-wise direction of the work vehicle;

a second guide member coupled to the second wall;

a hood configured to extend in a lengthwise direction of the work vehicle between a forward end and an aft end and in the cross-wise direction between a first side and a second side so as to at least partially cover the engine compartment, the hood being pivotally coupled to a portion of the work vehicle such that the forward end is configured to be moved upwardly and downwardly relative to the engine compartment to move the hood between an opened position and a closed position;

a first guide component coupled to the hood at or adjacent to the first side of the hood; and a second guide component coupled to the hood at or adjacent to the second side of the hood, wherein, when the hood is moved from the opened position to the closed position, the first and second guide components are configured to contact the first and second guide members, respectively, prior to contacting outer surfaces of the first and second walls, respectively, to guide the hood towards the closed position.

2. The system of claim 1, wherein the first and second guide components are configured to transition from outer guide surfaces defined by the first and second guide members to the outer surfaces of the first and second walls as the hood is moved towards the closed position.

3. The system of claim 1, wherein the first guide member includes a first base portion coupled to the first wall and a first angled portion extending inwardly from the first base portion towards the second wall and wherein the second guide member includes a second base portion coupled to the second wall and a second angled portion extending inwardly from the second base portion towards the first wall.

4. The system of claim 3, wherein, when the hood is moved from the opened position to the closed position, the first and second guide components are configured to contact the first and second angled portions, respectively, prior to contacting the outer surface of the first and second walls.

5. The system of claim 1, wherein the first guide component comprises a first guide roller and the second guide component comprises a second guide roller.

6. The system of claim 5, wherein a cross-wise width defined between the first and second guide components in the cross-wise direction of the work vehicle is less than a corresponding cross-wise width is defined between the outer surfaces of the first and second walls when the hood is at the opened position.

7. The system of claim 5, wherein the first guide roller is rotationally supported by a first mounting bracket coupled to the hood at or adjacent to the first side of the hood and the second guide roller is rotationally supported by a second mounting bracket coupled to the hood at or adjacent to the second side of the hood.

8. The system of claim 7, wherein the first mounting bracket is coupled to a first flange extending inwardly from the first side of the hood and the second mounting bracket is coupled to a second flange extending inwardly from the second side of the hood.

9. The hood guiding system of claim 1, wherein the first and second walls correspond to first and second sidewalls of a cooling module of the work vehicle, the cooling module including at least one heat exchange component.

10. A work vehicle, comprising:

a cooling module positioned within an engine compartment of the work vehicle, the cooling module including at least one heat exchange component and first and second sidewalls spaced apart from each other in a cross-wise direction of the work vehicle;

a hood configured to extend in a lengthwise direction of the work vehicle between a forward end and an aft end and in the cross-wise direction between a first side and a second side so as to at least partially cover the engine compartment, the hood being pivotally coupled to a portion of the work vehicle such that the forward end is configured to be moved upwardly and downwardly relative to the cooling module to move the hood between an opened position and a closed position;

a first guide roller coupled to the hood at or adjacent to the first side of the hood; and a second guide roller coupled to the hood at or adjacent to the second side of the hood, wherein, when the hood is moved from the opened position to the closed position, the first and second guide rollers are configured to contact outer surfaces of the first and second sidewalls, respectively, to guide the hood towards the closed position.

11. The work vehicle claim 10, further comprising a first guide member coupled to the first sidewall and a second guide member coupled to the second sidewall.

12. The work vehicle claim 11, wherein, when the hood is moved from the opened position to the closed position, the first and second guide rollers are configured to contact the first and second guide members, respectively, prior to contacting the outer surface of the first and second sidewalls.

13. The work vehicle claim 12, wherein the first and second guide rollers are configured to transition from outer guide surfaces defined by the first and second guide members to the outer surfaces of the first and second side walls as the hood is moved towards the closed position.

14. The work vehicle claim 11, wherein the first guide member includes a first base portion coupled to the first sidewall and a first angled portion extending inwardly from the first base portion towards the second sidewall and wherein the second guide member includes a second base portion coupled to the second sidewall and a second angled portion extending inwardly from the second base portion towards the first sidewall.

15. The work vehicle of claim 14, wherein, when the hood is moved from the opened position to the closed position, the first and second guide rollers are configured to contact the first and second angled portions, respectively, prior to contacting the outer surface of the first and second sidewalls.

16. The work vehicle of claim 14, wherein a portion of an outer guide surface defined by the first base portion is substantially coplanar with the outer surface of the first sidewall and wherein a portion of an outer guide surface defined by the second base portion is substantially coplanar with the outer surface of the second sidewall.

17. The work vehicle claim 11, wherein a cross-wise width defined between the first and second guide rollers in the cross-wise direction of the work vehicle is less than a corresponding cross-wise width defined between the outer surfaces of the first and second sidewalls when the hood is at the opened position.

18. The work vehicle claim 11, wherein the first guide roller is rotationally supported by a first mounting bracket coupled to the hood at or adjacent to the first side of the hood and the second guide roller is rotationally supported by a second mounting bracket coupled to the hood at or adjacent to the second side of the hood.

\* \* \* \* \*